H. W. EDEN.
CAP NUT.
APPLICATION FILED APR. 1, 1909.
997,118.
Patented July 4, 1911.
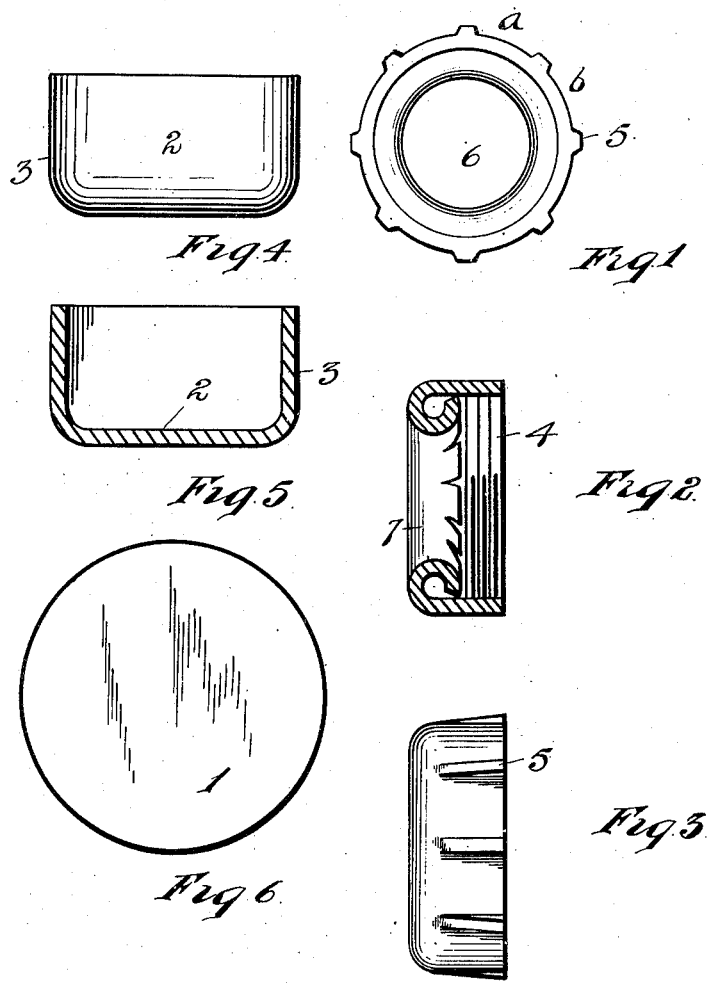

UNITED STATES PATENT OFFICE.

HAROLD W. EDEN, OF DETROIT, MICHIGAN.

CAP-NUT.

997,118.  Specification of Letters Patent.  Patented July 4, 1911.

Application filed April 1, 1909. Serial No. 487,193.

*To all whom it may concern:*

Be it known that I, HAROLD W. EDEN, a citizen of the United States, residing at Detroit, county of Wayne, State of Michigan, have invented a certain new and useful Improvement in Cap-Nuts, and declare the following to be a full, clear, and exact description of the same, such as will enable others skilled in the art to which it pertains to make and use the same, reference being had to the accompanying drawings, which form a part of this specification.

This invention relates to cap nuts, and has for its object an interiorly threaded tubular member adapted to be used as a nut or bur in connection with a thread bolt or exteriorly threaded tube, and its novelty consists in an interiorly threaded tube made by pressing the tube against a threaded die, in this instance being similar in structure to the threaded end of a bolt, and differing from the ordinary tap with which screws are made, in that it is provided with no longitudinal grooves, and is not used as a cutting tool, but simply as a resistance tool, into the interstices of which the metal of the nut or cap is forced.

In the drawing:—Figure 1, shows the nut or cap in plan view. Fig. 2, is a cross section, through the center of the nut showing the inner surface. Fig. 3, is a perspective, showing the external appearance. Fig. 4, is an elevation, showing the appearance of the partially finished nut. Fig. 5, is a section showing the partially finished nut. Fig. 6, is a plan view, showing the blank from which the nut is formed.

In producing this nut, a round blank 1, Fig. 6, is cut from sheet metal. At the first operation, this is dished and drawn by compressing the edges and drawing the metal into the cup shaped form shown in Fig. 4. The third operation results in making the finished nut, and consists in inserting a screw thread die (not shown) into the cup 2, and forcibly compressing the metal of the side walls 3 of the cup 2 against the screw thread die, with a force sufficient to cause the metal to flow into the interstices or grooves between the threads, forming the interior threads 4, shown in Fig. 2, and by suitable shaping of the face of the die or other instrument with which pressure is exerted upon the outside of the blank, forming the exterior projections 5, shown in Figs. 1 and 3, which serves as a wrench-hold to turn the nut. A final operation punches out a portion of the web 6, and turns in the margin around the punched-out portion, forming the finished edge or stop shoulder 7, shown in Fig. 2. If desired, this edge may be cut off by a trimming tool, leaving a nut, through which the bolt may entirely run. With well made tools, the thread 4 is continuous, no break being visible in it between faces, as $a$ and $b$, Fig. 1, even by the use of a magnifying glass.

What I claim is:—

1. A cap screw stamped from a blank, the same being centrally apertured and having the margin of the aperture inturned to form a stop shoulder, substantially as described.

2. A cap screw stamped from a blank and having a body portion internally stamp-threaded and externally stamp-ribbed, and having one end thereof apertured and turned in to form a stop shoulder, substantially as described.

3. A cap screw having a tubular portion stamped from a blank and centrally apertured, and internally threaded and externally ribbed, and having a tubular end inturned, substantially as described.

4. A cap screw, having a cylindrical portion stamped from a blank, said portion being internally-threaded and externally ribbed for wrench engagement, and having one of its ends turned in to form a stop shoulder, substantially as described.

In testimony whereof, I sign this specification in the presence of two witnesses.

HAROLD W. EDEN.

Witnesses:
  WILLIAM M. SWAN,
  ALECIA TOWNSEND.